May 28, 1963 H. G. STENGER 3,090,994
PLASTIC FORMING MACHINE ORIFICE STRUCTURE
Filed March 20, 1961 4 Sheets-Sheet 1
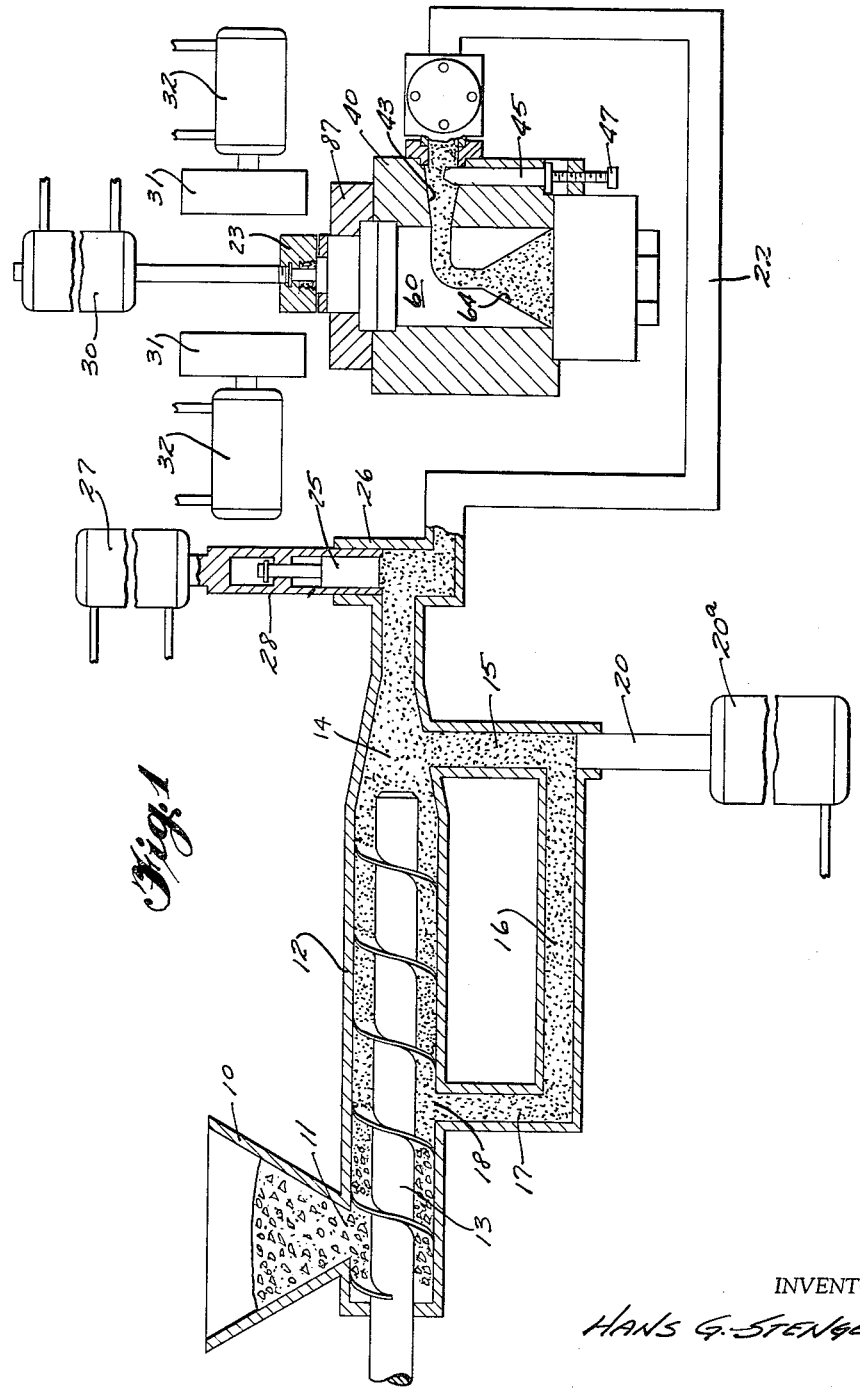
INVENTOR
HANS G. STENGER
BY SPENCER L. BLAYLOCK, JR
& W. A. SCHAICH
ATTORNEYS

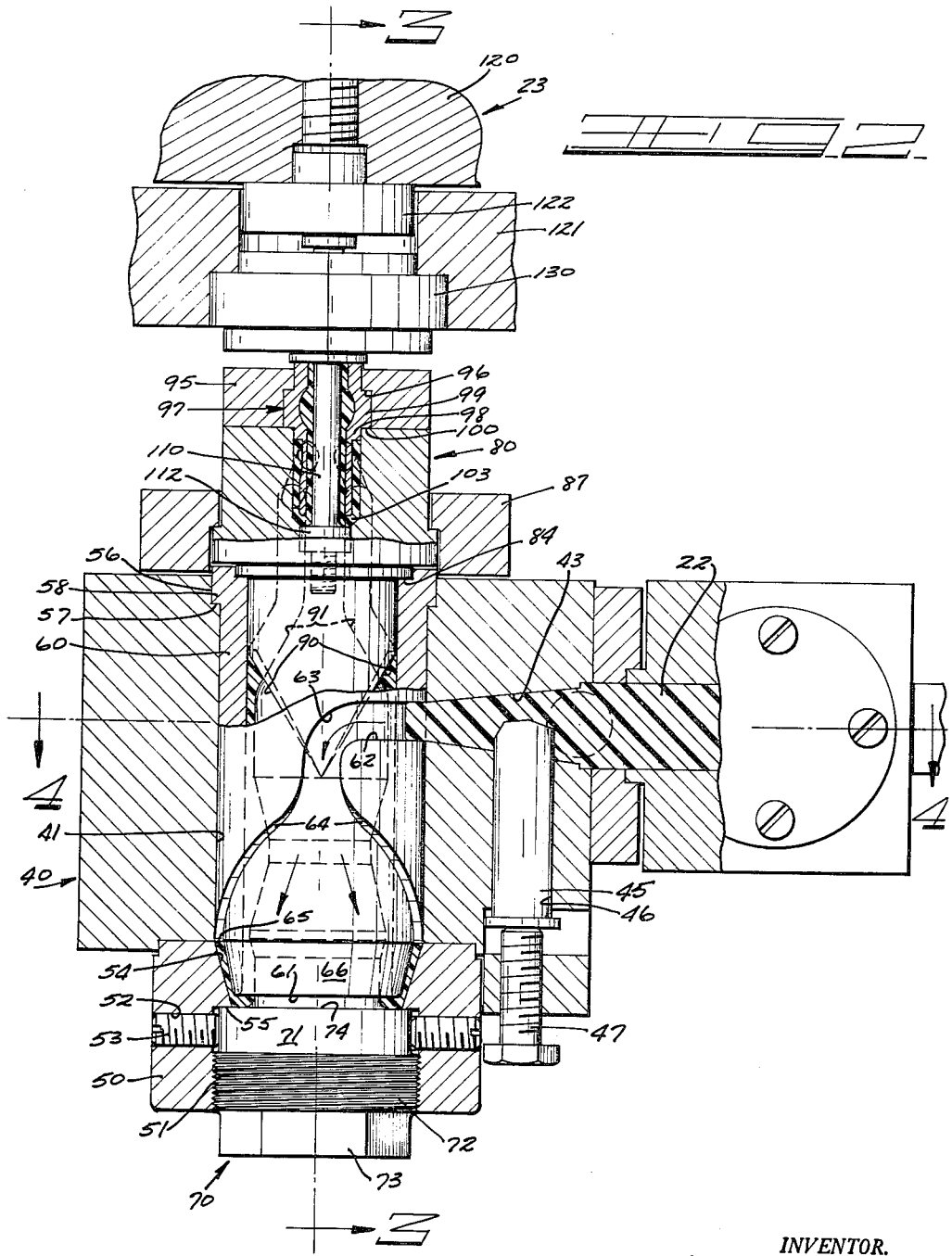

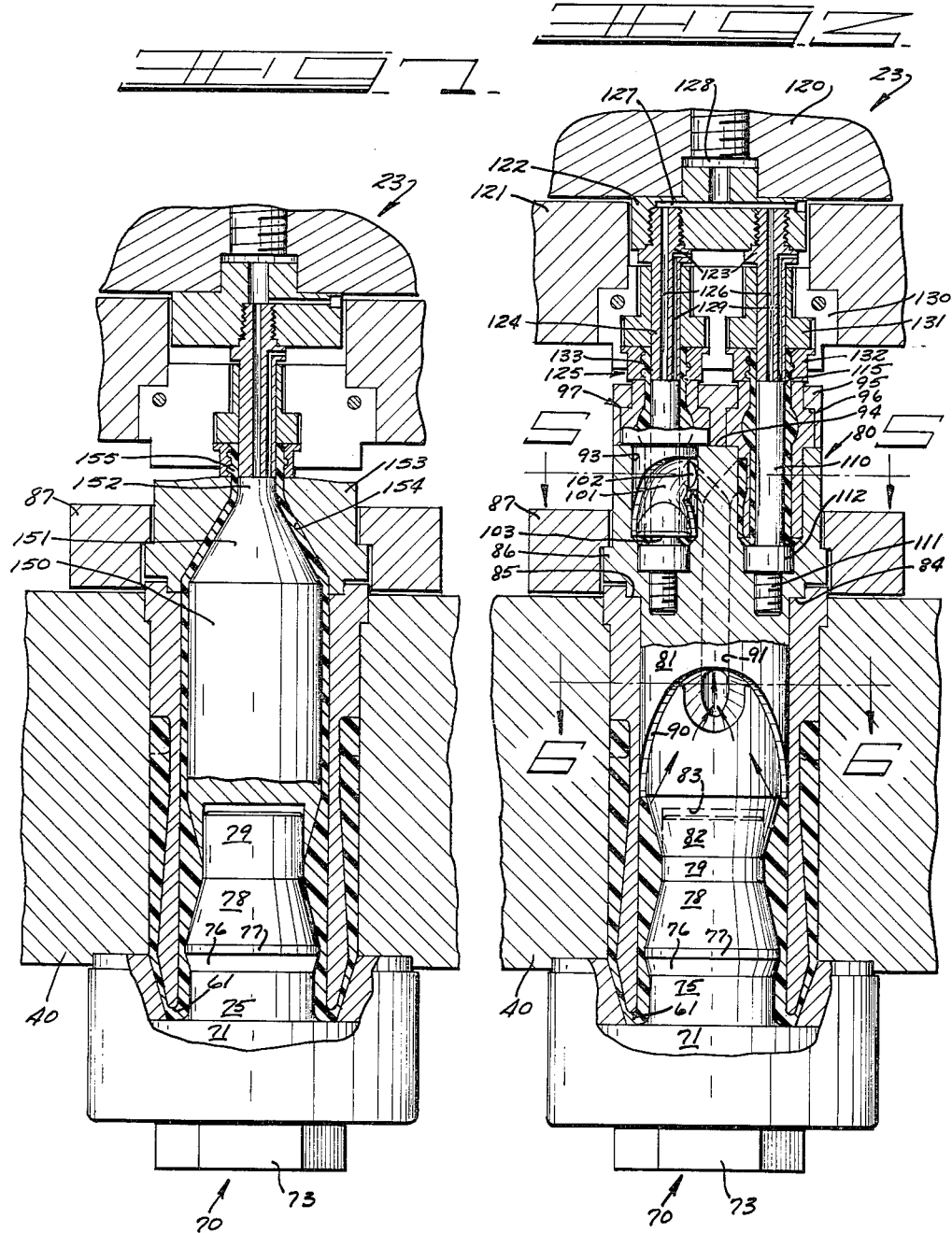

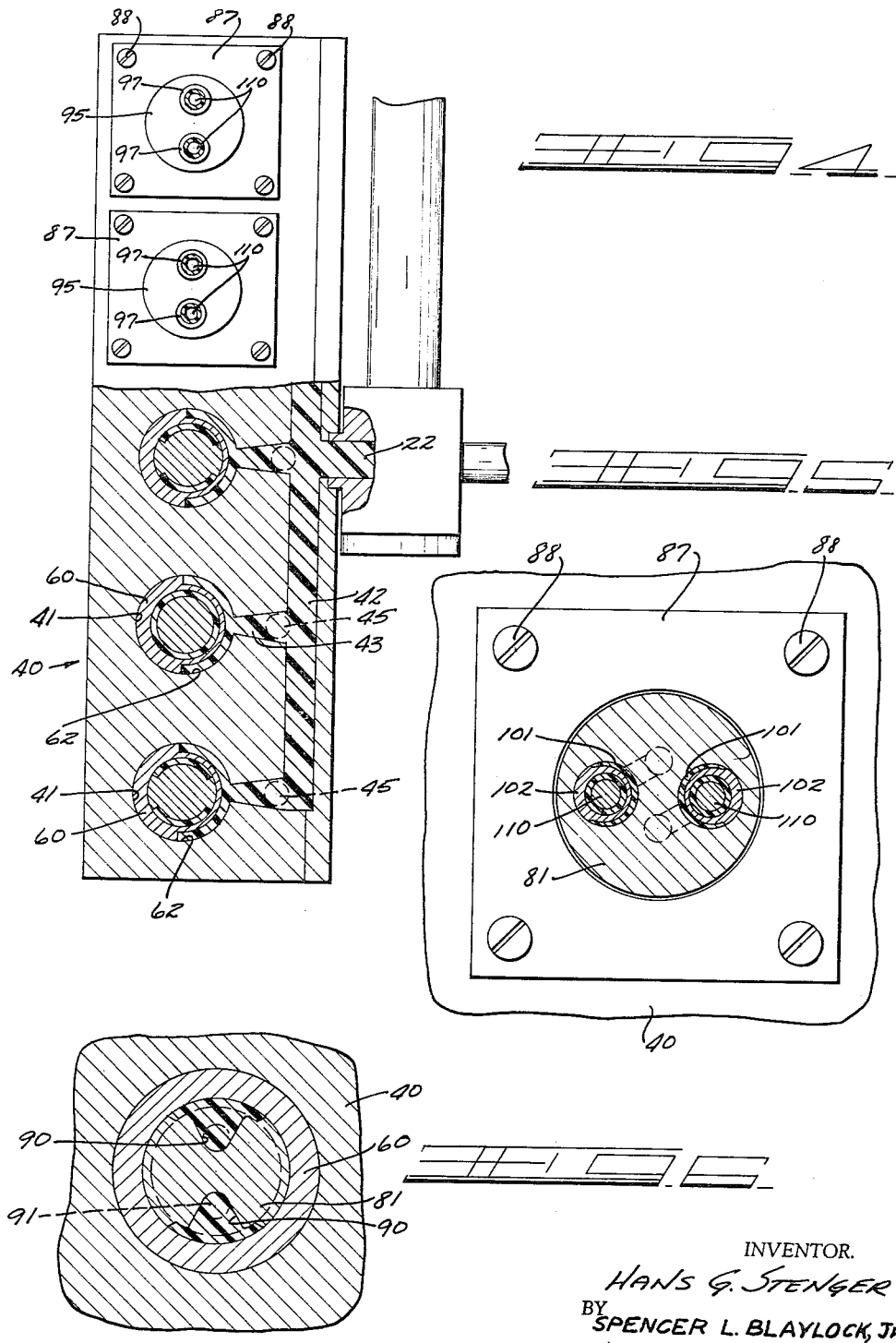

United States Patent Office 3,090,994
Patented May 28, 1963

3,090,994
PLASTIC FORMING MACHINE ORIFICE
STRUCTURE
Hans G. Stenger, Lambertville, Mich., assignor to Owens-Illinois Glass Company, a corporation of Ohio
Filed Mar. 20, 1961, Ser. No. 97,002
7 Claims. (Cl. 18—14)

The present invention relates to an apparatus and method for making plastic articles and more particularly to a method of and apparatus for making plastic articles utilizing an improved orifice structure.

In my earlier filed copending patent application, Serial No. 802,963, filed in the United States Patent Office on March 30, 1959, now Patent No. 3,054,143 and assigned to the assignee of the present invention, I have disclosed a method of and apparatus for making plastic articles and utilizing a plastic machine orifice structure whereby a tube is extruded through an annular orifice for subsequent blowing into a final article. The specific orifice structure of this earlier application provided concentric sleeve and mandrel elements with countercurrent plastic flow occurring along the exterior periphery of the sleeve and then intermediate the inner periphery of the sleeve and the mandrel for expression through an orifice aligned with the mandrel.

The present invention constitutes a specific improvement over the method and apparatus of the earlier application by providing a flow path for plasticized material which is free of dead spots and free of material accumulation zones, so as to maintain a free and continuous flow of plasticized material therethrough. Further, the present invention extends the scope of the earlier method and apparatus by providing for the formation of a plurality of articles at a single orifice station of my prior structure.

More specifically, the orifice sleeve of the present invention is provided with exterior semi-peripheral grooves which are progressively peripherally widened toward a free end of the sleeve until full peripheral flow of plastic is obtained beneath the sleeve end and into the space intermediate the sleeve inner periphery and the mandrel. In this manner, the accumulation of plasticized material in "dead spots" or other accumulation areas is avoided and thermal degradation of the plastic material to form unsightly lines or spots in the final articles is prevented.

Further, the method and apparatus of the present invention provides for the substitution of a multiple orifice structure at each single orifice station of a conventional plastic article forming machine, so that the number of articles made by the machine is increased by at least one hundred percent. In a specific embodiment of the machine, a conventional five-orifice machine for the simultaneous manufacture of five containers varying in size (measured in liquid capacity) from six ounces to sixteen ounces was adapted to the simultaneous manufacture of ten containers each having a capacity from one to four ounces. Thus, the economical manufacture of small articles becomes possible.

In the conversion of the conventional machine to a series of multiple orices, the conventional orifice sleeve is utilized, but the conventional central mandrel is replaced by a flow dividing element which subdivides the plastic material flow into and through the sleeve and which introduces the plastic material into individual smaller orifices located in parallel, each of the orifices being provided with individual sleeve and mandrel structures for insuring the smooth and uninterrupted expression of plastic material therethrough.

It is, therefore, an important object of the present invention to provide a new and improved method of and apparatus for making plastic articles by utilization of a novel orifice structure.

Another important object of this invention is the provision of a novel orifice structure for a plastic extrusion device including a mandrel-surrounding sleeve having exterior tapered flow passages of gradually increasing peripheral extent for introducing plastic around the full periphery of a free end of the sleeve for travel to the orifice intermediate the sleeve interior and the mandrel.

It is a further important object of the present invention to provide a new and novel orifice structure for the conversion of a conventional single orifice station of a plastic forming machine to a multiple orifice structure capable of simultaneously forming a plurality of articles.

Yet another important object is the provision of a method of making a plastic article by flowing separate streams of plastic material about an orifice sleever, merging the separate plastic streams into a single full peripheral plastic flow for introduction into the open end of a sleeve and flow along the inner periphery thereof and in contact with an internal mandrel to an orifice.

Still another object of this invention is the provision of an improved plastic forming machine and method wherein plasticized material fed from an inlet opening is initially subdivided into separate streams which are merged for flow into and through a sleeve, the flow through the sleeve being again subdivided for flow to separate orifices at which individual articles are to be formed.

Other objects of this invention will appear in the following description and appended claims, reference being had to the accompanying drawings forming a part of this specification wherein like reference characters designate corresponding parts in the several views.

On the drawings:

FIGURE 1 is a schematic representation of a plastic forming machine provided with an orifice structure of the present invention and adapted to carry out the method of this invention;

FIGURE 2 is a vertical sectional view of the orifice structure of the present invention;

FIGURE 3 is a view taken along the plane 3—3 of FIGURE 2;

FIGURE 4 is a sectional view taken along the plane 4—4 of FIGURE 2;

FIGURE 5 is a view taken along the plane 5—5 of FIGURE 3;

FIGURE 6 is a sectional view taken along the plane 6—6 of FIGURE 3;

FIGURE 7 is a view similar to FIGURE 3 illustrating a modified orifice structure of the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

The apparatus of the present invention and the method of this invention have been developed primarily for the utilization of plasticizable materials, preferably polyethylene or other similar thermoplastic materials.

Generally, the apparatus includes a hopper 10 within which granular polyethylene or similar material is stored and communicating at its lower end, as at 11, with an elongated chamber or barrel 12 of an extruder-plasticizer. Disposed within the plasticizer barrel 12 is an extruder screw 13 which rotates continuously to advance material to a discharge outlet 14. As the material is advanced by the extruder screw 13 within the plasticizer barrel 12, the material is worked under pressure and is subjected to heat to render the material plastic and in fluid form as it issues from the free end of the extruder tube 12. The free end of the extruder barrel communicates with a recirculation passage including conduits 15, 16 and 17, which establishes communication from the discharge end 14 of the extruder screw to a portion 18 of the barrel displaced longitudinally from the hopper 10 and located at a point at which the material within the extruder barrel 12 is reduced to a viscous, fluid state. Recirculation of material through the recirculation passage is controlled by a recirculation piston 20a which is single acting and which is fluid pressure actuated, as by cylinder 21, to supplement the extruder output during certain portions of the cycle and which also serve to control recirculation of the thermoplastic material.

The primary purpose of recirculation is to accommodate continuous operation of the extruder screw 12 and to accommodate continuous plasticizing action without the necessity of halting and initiating extruder operations with each molding and blowing cycle. In effect, the recirculation passage forms a reserve or overflow accumulator into which the output of the extruder screw 13 flows when the extruder output is not being utilized, this accumulator being vented back to the plasticizer.

The extruder and plasticizer output communicates with a plurality of restricted annular orifices 21 (FIGURE 2) through an elongated passage 22. Overlying each such orifice 21 and in communication therewith is a neck mold 23 formed of separable neck mold halves. The neck or finish of the container is normally the most critical portion of the container, so far as dimensions are concerned, and in order to maintain these dimensions within the rather close tolerances required, the finish is preferably injection molded. The neck mold 23 thus becomes an injection mold. Injection molding usually requires pressures different from those normally provided by a combination extruder and plasticizer, and this different pressure is utilized only during the injection molding step of the cycle. For such intermittent injection operations, the apparatus of the present invention utilizes an injection piston 25 which is fluid-pressure displaceable into the conduit 22 filled with plasticized material intermediate the plasticizer outlet 14 and the orifice 21.

For the injection operation to be effective, the back flow of plastic to the plasticizer screw 13 must be prevented and a column of plasticized material must be isolated between the injection piston 25 and the neck mold 23. This isolation is carried out by a sleeve valve 26 concentric with the injection piston 25 and insertable into the plasticized material conduit. Further, this sleeve valve is closed at all times at which plastic material is not being expressed through the orifice from the extruder-plasticizer. An actuating means for sequentially actuating the sleeve valve and the injection piston and also for operating the sleeve valve independently of the piston is provided by fluid-pressure cylinder 27 having an actuating rod 28 rigid with the sleeve 26 and having a lost-motion connection with the injection piston 25.

Following the injection of the finish within the separable neck mold 23, extrusion of plasticized material from the extruder-plasticizer through the orifice 21 occurs during elevation of the neck mold 23 by its actuating cylinder 30, so that an extruded tubular extension is formed integral with the material filling the neck mold.

Following the extrusion of the tubular extension and movement of the neck mold 23 from its illustrated position overlying the orifice, the tubular extension is enclosed within a pair of separable blow molds 31 by actuation of cylinders 32 and blow air or other pressured fluid is introduced through the neck mold 23 to blow the container to its final configuration.

The above-described structure and its operation are more fully described in the copending U.S. application of R. C. Allen and L. E. Elphee, Serial No. 797,276, filed March 4, 1959, now Patent No. 3,008,192 and assigned to the assignee of the present invention.

The present invention is particularly concerned with the orifice structure illustrated in FIGURES 2 through 7 and reference to these figures is made for the detailed structure of the present invention.

From FIGURE 4 of the drawings, it will be seen that the orifice block 40 is provided with a plurality of vertically extending bores 41 each of which is adapted to receive plasticized material from the passage 22 from an elongated common or primary passage 42 and individual lateral passages 43. To balance out the flow through the lateral passages 43, there are provided a plurality of vertically adjustable flow control valves 45, (FIGURE 2) individually located in vertical bores 46 intersecting the lateral passages 43, the upper ends of these valves 45 being insertable to a greater or lesser degree into the lateral passages 43 upon adjustment of an adjusting nut 47.

The lower open end of each of the vertical bores 41 in the orifice block 40 is closed by a mandrel-support block 50 having a lower threaded aperture 51 and diametrically opposed lateral threaded apertures 52 receiving set screws 53 for a purpose hereinafter more fully described. The inner bore of each such support element 50 includes an upper frusto-conical recess 54 terminating in a downwardly directed, radially enlarged flange 55.

Each of the orifice block bores 41 is provided with an outwardly enlarged upper recess 56 cooperable with the bore to define a radially enlarged shoulder 57 upon which is seated a radially enlarged shoulder 58 formed on an orifice sleeve 60. Each of these sleeves 60 is substantially cylindrical in configuration and fits snugly within its associated bore 41, so that the lower free terminal end 61 thereof depends into the associated plug 50 to terminate in spaced relation to the plug shoulder 55.

As best illustrated in FIGURES 2 and 4, each of the sleeves is provided with a substantially semi-peripheral exterior groove 62 located medially of the length of the sleeve for full, accurate registry with the adjacent, corresponding transverse flow passage 43. This groove 62 merges through an arcuate downwardly extending joining portion 63 with a lower groove portion 64 of downwardly peripherally increasing extent. It will be understood that groove portions 63 and 64 are provided as diametrically opposed portions of the sleeve exterior periphery and that the grooves 64 merge (as at 65) adjacent the lower extremity of the sleeve.

Thus, the grooves 64 encircle the entire periphery of the sleeve at the lowermost portion 66 thereof, i.e. that portion intermediate the lowermost extremity 61 of the sleeve and the bottoms 65 of the grooves 64. This lowermost portion 66 radially registers with the conical wall 54 of the plug 50. It will also be noted that the radial extent or depth of the grooves 64 decreases as the peripheral extent thereof increases toward the groove bottoms 65, while the exterior lowermost surface portion 66 of the sleeve is tapered to lie substantially parallel to the conical recess wall 54 of the plug 50.

The interior periphery of the sleeve 60 is truly cylindrical in contour, and the lower edge 61 of the sleeve is, of course annular, and is rounded to prevent the occurrence of sharp or square corners.

Threaded into the plug 50 closing the open lower end of the bore 41 is a lower mandrel element, identified generally at 70, comprising a lower cylindrical portion 71 provided with peripheral threads 72 threadedly engaging the interior threads 51 of the plug. The mandrel element 70 is provided at its lower extremity with a polygonal, preferably hexagonal, head 73 by means of which the mandrel element may be readily threaded into the plug and axially adjusted therein. The cylindrical portion of the mandrel element terminates in an upper annular surface 74 sealingly engaging the downwardly directed shoulder 55 of the plug 50, and the set screws 53, projecting radially through their threaded apertures 52, abut the cylindrical portion 71 of the mandrel element to provide for minute lateral adjustment of the mandrel element for a purpose to be hereinafter more fully described.

Above the cylindrical portion 71, the mandrel element 70 includes a cylindrical portion 75 projecting into the interior of the sleeve 60 and concentric therewith, an upwardly and outwardly tapered conical section 76, a relatively short cylindrical section 77 and an elongated upwardly and inwardly tapering conical section 78. The terminal, upper, reduced-diameter portion 79 of the mandrel 70 is cylindrical. The specific contour of the upper portions of the lower mandrel element 70 is best illustrated in FIGURES 3 and 7 of the drawings.

Superimposed upon the mandrel element 70 is an upper mandrel element 80, as best illustrated in FIGURE 7, comprising a generally cylindrical medial portion 81 having a lower inwardly and downwardly tapering portion 82 provided with a cylindrical, open bottomed recess 83 into which the upper terminal end 79 of the lower madrel element 70 projects. The upper portion of the medial cylindrical section 81 of the upper mandrel element 80 is provided with a first radially enlarged shoulder 84 seated upon a corresponding shoulder 85 formed at the inner periphery of the sleeve 60 and with a second upwardly directed shoulder 86 against which is seated an orifice hold-down block 87 secured to the orifice block 40 by suitable means, as by cap screws 88 (FIGURE 4). The upper mandrel element is thus rigidly suspended in the sleeve 60.

As will be seen from FIGURE 3, the medial cylindrical portion 81 of the upper mandrel element 80 fits snugly within the inner periphery of the sleeve, thereby effectively blocking any attempted flow of plasticized material upwardly between the element 80 and the sleeve 60. Plasticized material flow passages or recesses are provided in the exterior periphery of the cylindrical mandrel portion 81 by diametrically opposed notches or grooves 90 therein, such grooves being of inverted U-shape so as to be of upwardly reduced peripheral extent. As best indicated in FIGURE 2 of the drawings, these grooves 90 mate at the point of juncture of the medial cylindrical portion 81 of the mandrel element 80 and the lower tapered extremity 82 thereof, the grooves meeting in a V-shaped configuration, so as to transversely divide plastic material flowing upwardly within the sleeve 60 and beyond the lower mandrel element 70.

The apex of each of the grooves 90 forms the inlet opening of a substantially vertically disposed interior passage 91 for plasticized material. A passage 91 is provided for each of the grooves 90, and the passages 91 serve to join each of the grooves 90 to an upper vertically extending recess 93 formed in the upper free surface 94 of the upper mandrel portion 80.

Superimposed on the free upper end of the mandrel section 20 is a retainer cap 95 secured thereto by suitable means (not shown) and provided with undercut shoulders 96 to retain therein upper sleeves 97. These sleeves 97, as best shown in FIGURES 2 and 3, are quite similar to the sleeve 60 earlier disclosed. More specifically, such sleeves 97 are provided with lower cylindrical extremities 98 merging with an enlarged medial portion 99 through radially enlarged shoulders 100 seated on the upper surface 94 of the upper mandrel element 80 and retained thereagainst by the cap shoulders 96.

The lower cylindrical portion of each of the sleeves 93 is provided with peripheral grooves 101 of downwardly increasing peripheral extent and having upper extremities 102 registering with the upper end of the corresponding passage 91, respectively, to receive plasticized material therefrom. The sleeves 97 are each supported by the integral shoulders 100, so that the lower extremities 103 thereof terminate short of the bottoms of the recesses 93. Thus, plasticized material flowing through the grooves 101 will be free to pass beneath the lower extremities 103 of the sleeves and upwardly through the interior thereof in a manner analogous to the flow of plastic material beneath the lower extreme edge 61 of the sleeves 60 heretofore described. Projecting axially of each of the sleeves 97 is an elongated mandrel pin 110 having its lower end threaded, as at 111, beneath a generally cylindrical embossment 112 by means of which the mandrel pins 110 are bottomed in the recesses 93.

It will be noted from FIGURES 2 and 3 that the flow passage defined intermediate each of the sleeves 97 and the associated mandrel pin 110, i.e. at the inner periphery of the sleeves 97, is substantially cylindrical with the exception of a bulbous enlargement therein, this enlargement being located interiorly of the medial enlarged portion 96 of each of the sleeves in spaced relation to the orifice 115 defined by the upper extremity of each sleeve and the terminal face of the associated mandrel pin 110.

Superimposed over the mandrel assembly, consisting of the lower mandrel element 70 and the upper mandrel element 80 is the neck mold assembly, indicated generally at 23. This assembly consists of an upper neck mold block 120 and a lower carrier plate 121. The upper block 120 carries a neck manifold 122 into which is threaded a pair of spaced depending neck pins 123. These pins have cylindrical lower ends 124 which define the center insert of neck mold assemblies 125, the pins having axially extending air inlet passages 126 communicating through a transverse manifold passage 127 with a vertical air passage 128 in the neck mold block and connected to a suitable source of air under pressure. The neck pins 123 are also provided with exhaust passages 129 parallel to the air passages 126.

Carried by the lower plate 121 for transverse separating movement (in a plane normal to that of FIGURE 3) are neck mold support blocks 130, these blocks carrying for such separating movement semi-cylindrical neck mold end plugs 131 the lower surfaces of which define the upper extremity of the neck molds, and lower neck mold elements 132, the inner surfaces of which are appropriately contoured to the exterior surface of a container neck or the like and which are spaced radially from the exterior periphery of the neck mold pins 124 to define therebetween a neck mold recess 135 within which the neck or finish portion of a container is injection molded from material issued from the orifices 115.

It will, of course, be readily understood by those skilled in the art that the neck mold assembly 23 cooperates with the orifices 115 to define injection mold assemblies within which plasticized material issued from the orifices is confined and at least partially cured to a self-sustaining state. Following such curing of the injection molded material within the mold spaces 133, the neck molds are retracted upwardly by means of the cylinder 30 while additional plastic material issues from the orifices 115 as a tubular extension formed integrally with material filling the neck molds.

After tubes of the desired length have been extruded, the blow molds 31 are closed on the tubes and the tubes are blown to their final configuration by means of air or other blowing medium introduced through the passages 126 and exhausted through the exhaust passages 129.

Considering now more fully the flow of material through the machine from the plasticized material inlet openings 43 to the orifices 115, it will be appreciated that initial flow from the passages 43 and into the sleeve grooves 62 is passed peripherally of the sleeve into the diametrically opposed downwardly directed flow passages 63 and then through the gradually widened, but increasingly radially restricted, passages 64 until after leaving the grooves 64, actually at the point 65, full peripheral flow about the sleeve is obtained in the region indicated at 66. This full peripheral flow about the sleeve occurs so that material is introduced in a full peripheral, annular path beneath the sleeve edge 61 into the interior of the sleeve.

Material flow interiorly of the sleeve occurs about the mandrel comprising the lower mandrel section 70 and the upper mandrel section 80. More particularly, the flow occurs beneath the edge 61 and upwardly through the alternately restricted and enlarged flow path defined intermediate the mandrel surfaces 75, 76, 78, 80 and 82 and the smooth cylindrical peripheral interior surfaces of the sleeve.

After passage of the plasticized material past the gradually restricting surface 82, the plasticized material flows into the inverted U-shaped notches 90, the flow being gradually peripherally restricted until all of the plasticized material is forced through the diametrically opposed internal flow passages 91.

Flow through these internal passages 91 is directed to one or the other of the upper recesses 93. More specifically, such flow then occurs along the outer periphery of the upper sleeve 97 through the outer peripheral grooves 101 and 102 thereof, then beneath the upper sleeve lower edge 103, actually between the edge 103 and the enlarged head 112 of the mandrel element 110. The plasticized material then flows through the passage defined intermediate the upper mandrel 110 and the inner periphery of the sleeve 97, the flow being alternately enlarged and reduced by virtue of the bulbous enlargement in the sleeve upper portion, until the plasticized material issues from the orifice 115. From the orifice, material issues into the neck mold assembly 23 to be injection molded therein, if the neck mold is positioned as illustrated in FIGURE 3 in abutment with the upper surface of the sleeve 97, or the material is extruded into the open air in the event that the neck mold assembly 23 has been vertically upwardly retracted by its cylinder.

As a result of this initial subdivision of the flow about the exterior periphery of the outer sleeve 60 and then through the interior of the sleeve 60 for subsequent further subdivision and flow through the passages 91 to the upper sleeve and mandrel assembly through which flow ultimately occurs to the orifices 115, all eddy currents and turbulences within the plastic material are eliminated and a smooth, unidirectional (i.e. axial) flow of plastic material through the orifices is obtained. If an attempt were made to merely directly subdivide the flow from the interior of the lower sleeve and then direct this material through separate orifices, fluid flow marks would appear in the tube extruded through the orifices and even in the final blown article. The device of the present invention avoids any such flow marks and results in an extruded tube of extremely fine quality.

In the event that the issuance of only a single tube from each of the recesses 41 is desired, the structure of FIGURE 7 is utilized wherein the upper mandrel element 150 is provided with a smooth cylindrical exterior surface merging through an upper, frusto-conical portion 151 with a terminal upper tip portion 152 of cylindrical configuration. Of course, the identical sleeve 60 is utilized, and this sleeve is surmounted by an orifice block 153 having an interior surface 154 tapered for parallel configuration to the surface 151 and 152 of the upper mandrel element 150. Inasmuch as only a single orifice 155 is provided, only a single neck mold assembly 23 is utilized in conjunction therewith.

That embodiment of FIGURE 7 of the drawings obtains all of the advantageous results of subdivided, diametrically opposed flow of plasticized material at the exterior of the sleeve 60, of flow about the lower sleeve edge 61 and of flow through the varying flow paths defined between the lower mandrel element 70 and the upper mandrel element 150.

It will be readily apparent that for conversion to single orifice operation, it is only necessary to remove the upper mandrel element 80 of the embodiment of FIGURE 3 and replace the same with the upper mandrel element 150 of the embodiment of FIGURE 7.

I claim:

1. In a method of supplying plastic material to a plurality of extrusion orifices, the steps of initially dividing a supply stream of material into two streams, flowing the streams externally of a sleeve in a direction away from the orifices, merging the streams at the outer periphery of the sleeve, flowing the merged stream about the end of the sleeve into the interior thereof to reverse the direction of flow, flowing the stream internally of the sleeve toward the orifices, dividing the merged stream internally of the sleeve into a plurality of individual streams, flowing each stream externally of a secondary sleeve to effect flow of the individual streams from the orifices, flowing each stream about the end of its secondary sleeve to reverse the direction of flow, flowing each of the individual streams through the interior of its secondary sleeve toward the associated orifice and finally issuing the streams from the orifices, respectively.

2. In a plastic forming machine having an orifice block in which a supply passage communicates with a block bore, means adapting the bore to the simultaneous issuance therefrom of a plurality of extruded tubes comprising a first mandrel positioned in the bore and having a pair of open-topped recesses therein, individual secondary mandrel elements secured in said recesses to define therewith annular flow channels and to project beyond the recesses, respectively, separate orifice plates each cooperating with one of the projecting secondary mandrel elements to define an individual extrusion orifice therewith, and individual flow openings in said first mandrel for supplying separate streams of plastic material from the block supply passage to the mandrel recesses and hence to the individual orifices.

3. In an extrusion orifice for a plastic forming machine, an orifice block having a bore therein and a transverse flow passage intersecting the bore medially of its length, an axially elongated sleeve positioned in the bore and having a free annular edge terminating adjacent one end of the bore, a cap closing the one end of the bore and having a portion spaced from the free sleeve edge to define a passage therebetween, and a mandrel located interiorly of the sleeve and concentric therewith to define an annular passage therebetween communicating at one end with the passage between the sleeve end and the cap and at the other end with the extrusion orifice, the improvements of an exterior flow passage on said sleeve defined by diametrically opposed recesses in the outer periphery of said sleeve of reduced cross-sectional dimension at their registry with the transverse flow passage of said block and of increasing peripheral extent toward the free annular edge of said sleeve, said recesses merging adjacent the free sleeve edge to accommodate full peripheral flow of material through the passage defined between the sleeve end and the cap.

4. In a plastic forming machine having a forming station at which a tube of plastic material is normally issued from a supply passage through a single extrusion orifice, defined peripherally of a mandrel located in a sleeve through which plastic material flow occurs, means replacing said mandrel and adapting the extrusion orifice to the simultaneous issuance therethrough of a plurality of extruded tubes comprising a generally cylindrical orifice insert insertable into said sleeve and having a plurality of spaced individual recesses at the one end thereof projecting beyond said sleeve and having flow dividing means at the other end thereof to divide plastic material flow through the sleeve into a plurality of streams, said insert also having separate interior flow passages therein connecting each of the recesses to one of said streams, respectively, individual mandrels disposed in said recesses, respectively, and projecting therebeyond, and separate orifice plates overlying said recesses, respectively, each such orifice plate having an aperture therein concentric with its respective mandrel to define an annular extrusion orifice therebetween.

5. In a method of supplying plastic material to a plurality of extrusion orifices, the steps of initially dividing a supply stream of material into two substantially equal streams, flowing the two streams in a direction away from the orifices, merging the streams, reversing the direction of flow of the merged stream to effect flow toward the orifices, again dividing the merged stream into a plurality of individual streams, reversing the direction of flow of the individual streams to effect flow thereof from the orifices, again reversing the direction of flow to effect flow of the streams toward the orifices, and finally issuing the streams from the orifices, respectively.

6. In an extrusion orifice for a plastic forming machine, an orifice block having a bore therein closed at one end and a transverse flow passage intersecting the bore medially of its length, an axially elongated sleeve suspended in the bore and having a free annular edge terminating in spaced relation to the closed end of the bore, said sleeve having its interior communicating with the orifice, said sleeve having diametrically opposed recesses in the outer periphery thereof registering with the transverse flow passage of said block and extending to the free edge thereof, said recesses being of increasing peripheral extent toward the free annular edge of said sleeve and merging adjacent the free sleeve edge to accommodate full peripheral flow of material about the sleeve end and into the interior thereof.

7. In a plastic forming machine having a forming station at which a tube of plastic material is normally issued from a supply passage through an extrusion orifice defined by a mandrel assembly concentric with a surrounding orifice plate, means adapting the forming station to the simultaneous issuance of a plurality of extruded tubes comprising a mandrel element having a pair of open-topped recesses therein, individual mandrels secured in said recesses to define therewith annular flow channels and to project beyond the recesses, respectively, separate orifice plates each cooperating with one of the projecting mandrels to define an individual extrusion orifice therewith, and flow dividing means interposed between the plastic supply passage and the annular flow channels to supply separate streams of plastic material to the annular flow channels and hence to the individual orifices.

References Cited in the file of this patent

UNITED STATES PATENTS

| | | |
|---|---|---|
| 2,688,154 | Huckfeldt | Sept. 7, 1954 |
| 2,780,835 | Sherman | Feb. 12, 1957 |
| 2,871,516 | Sherman et al. | Feb. 3, 1959 |
| 2,961,706 | Swenson | Nov. 29, 1960 |
| 2,977,634 | Morse | Apr. 4, 1961 |
| 2,978,748 | McCauley et al. | Apr. 11, 1961 |
| 2,960,958 | Ellis | Apr. 25, 1961 |

FOREIGN PATENTS

| | | |
|---|---|---|
| 862,941 | Great Britain | Mar. 15, 1961 |